US012711218B2

(12) United States Patent
Boham

(10) Patent No.: US 12,711,218 B2
(45) Date of Patent: Aug. 18, 2026

(54) COMPUTING DEVICE

(71) Applicant: Nicoventures Trading Limited, London (GB)

(72) Inventor: Scott George Boham, London (GB)

(73) Assignee: Nicoventures Trading Limited, London (GB)

( * ) Notice: Subject to any disclaimer, the term of this patent is extended or adjusted under 35 U.S.C. 154(b) by 509 days.

(21) Appl. No.: 18/247,665

(22) PCT Filed: Sep. 28, 2021

(86) PCT No.: PCT/GB2021/052512

§ 371 (c)(1),
(2) Date: Apr. 3, 2023

(87) PCT Pub. No.: WO2022/069879

PCT Pub. Date: Apr. 7, 2022

(65) Prior Publication Data

US 2024/0020375 A1 Jan. 18, 2024

(30) Foreign Application Priority Data

Oct. 2, 2020 (GB) ..................................... 2015678

(51) Int. Cl.

| | |
|---|---|
| ***G06F 21/00*** | (2013.01) |
| ***G06F 21/44*** | (2013.01) |
| ***G06V 30/224*** | (2022.01) |

(52) U.S. Cl.

CPC ............ *G06F 21/44* (2013.01); *G06V 30/224* (2022.01); *G06F 2221/2129* (2013.01); *G06F 2221/2149* (2013.01)

(58) Field of Classification Search

None

See application file for complete search history.

(56) References Cited

U.S. PATENT DOCUMENTS

| | | | | |
|---|---|---|---|---|
| 6,931,420 | B1 * | 8/2005 | Silvester | G06F 21/64 707/999.102 |
| 11,200,770 | B2 | 12/2021 | Hubbard et al. | |
| 11,842,347 | B2 * | 12/2023 | Keen | G06F 21/35 |

(Continued)

FOREIGN PATENT DOCUMENTS

| | | | |
|---|---|---|---|
| CN | 110675167 | A | 1/2020 |
| WO | 2019162152 | A1 | 8/2019 |
| WO | 2019162159 | A1 | 8/2019 |

OTHER PUBLICATIONS

"Help with Scan & Go", Available at: <https://web.archive.org/web/20200503092601/https://help.samsclub.com/app/answers/detail/a_id/2845/~/help-with-scan-%26-go>, May 3, 2020, pp. 1-9.

(Continued)

*Primary Examiner* — Maung T Lwin

(74) *Attorney, Agent, or Firm* — MERCHANT & GOULD P.C.

(57) ABSTRACT

A computing device is configured to receive an image containing a code associated with a consumable of an aerosol provision system. The computing device reads the code to generate consumable data and a digital signature. The computing device validates the digital signature using a public key of a key pair, and determines whether to approve the consumable based on the consumable data in response to the digital signature being validated.

20 Claims, 6 Drawing Sheets

(56) References Cited

U.S. PATENT DOCUMENTS

| | | | | |
|---|---|---|---|---|
| 11,934,565 | B2 * | 3/2024 | Ayoub | H04W 4/80 |
| 12,063,975 | B2 * | 8/2024 | Fard | A24F 40/53 |
| 12,162,194 | B2 * | 12/2024 | Fard | A24F 40/42 |
| 2013/0319439 | A1 | 12/2013 | Gorelick et al. | |
| 2015/0136158 | A1 | 5/2015 | Stevens et al. | |
| 2016/0019431 | A1 * | 1/2016 | Wang | G06V 30/224<br>382/182 |
| 2017/0208867 | A1 | 7/2017 | Li et al. | |
| 2018/0043114 | A1 | 2/2018 | Bowen et al. | |
| 2018/0263288 | A1 | 9/2018 | Goldstein et al. | |
| 2020/0000143 | A1 | 1/2020 | Anderson et al. | |
| 2020/0077708 | A1 | 3/2020 | Floyd | |
| 2020/0085105 | A1 * | 3/2020 | Barbaric | G06F 16/9035 |
| 2021/0019447 | A1 * | 1/2021 | Ayoub | G06F 21/64 |
| 2021/0036870 | A1 * | 2/2021 | Da Conceicao | H04L 9/3268 |

OTHER PUBLICATIONS

International Search Report and Written Opinion received for PCT Patent Application No. PCT/GB2021/052512, malled on Dec. 21, 2021, 12 Pages.

Chen, et al., "Improve the Performance of Traceability System by Using a Digital Certificate Enabled Anti-Counterfeit QR-Code Mechanism", International Journal of Social Science and Humanity, vol. 7, No. 8, Aug. 2017, pp. 564-568.

International Preliminary Report on Patentability received for PCT Patent Application No. PCT/GB2021/052512, mailed on Apr. 13, 2023, 8 pages.

* cited by examiner

COMPUTING DEVICE

PRIORITY CLAIM

The present application is a National Phase entry of PCT Application No. PCT/GB2021/052512, filed Sep. 28, 2021, which claims priority from GB Application No. 2015678.2, filed Oct. 2, 2020, each of which hereby fully incorporated herein by reference.

TECHNICAL FIELD

The present disclosure relates to a computing device and a method of approving a consumable of an aerosol provision system.

BACKGROUND

Electronic aerosol provision systems such as electronic cigarettes (e-cigarettes) generally contain an aerosol-generating material, such as a reservoir of a source liquid containing a formulation, typically including nicotine, or a solid material such as a tobacco-based product, from which an aerosol is generated for inhalation by a user, for example through heat vaporization. Thus, an aerosol provision system will typically comprise an aerosol generator, e.g. a heating element, arranged to aerosolize a portion of aerosol-generating material to generate an aerosol in an aerosol generation region of an air channel through the aerosol provision system. As a user inhales on the device and electrical power is supplied to the aerosol generator, air is drawn into the device through one or more inlet holes and along the air channel to the aerosol generation region, where the air mixes with the vaporized aerosol generator and forms a condensation aerosol. The air drawn through the aerosol generation region continues along the air channel to a mouthpiece, carrying some of the aerosol with it, and out through the mouthpiece for inhalation by the user.

It is common for aerosol provision systems to comprise a modular assembly, often having two main functional parts, namely an aerosol provision device and a consumable. Typically the consumable will comprise the consumable aerosol-generating material and the aerosol generator (heating element), while the aerosol provision device part will comprise longer-life items, such as a rechargeable battery, device control circuitry and user interface features. The aerosol provision device may also be referred to as a reusable part or battery section and the consumable may also be referred to as an article, disposable/replaceable part, cartridge or cartomizer.

The aerosol provision device and consumable are mechanically coupled together at an interface for use, for example using a screw thread, bayonet, latched or friction fit fixing. When the aerosol-generating material in an consumable has been exhausted, or the user wishes to switch to a different consumable having a different aerosol-generating material, the consumable may be removed from the aerosol provision device and a replacement consumable may be attached to the device in its place.

In order to ensure the safe and reliable operation of the aerosol provision system, it is recommended to use components, such as the aerosol provision device and consumable, that are produced by an approved or recommended manufacturer. Components manufactured by other parties may be produced to a lower standard and may cause harm or damage to the other components or the user when used as part of the aerosol provision system. As the aerosol provision device is designed to be reused consumable is designed to be removed and replaced, it is important to be able to verify each consumable that it used with the aerosol provision device as part of the aerosol provision system.

Various approaches are described herein which seek to help address or mitigate some of the issues discussed above.

SUMMARY

The disclosure is defined in the appended claims.

In accordance with some embodiments described herein, there is provided a computing device configured to receive an image containing a code associated with a consumable of an aerosol provision system. The computing device reads the code to generate consumable data and a digital signature. The computing device validates the digital signature using a public key of a key pair, and determines whether to approve the consumable based on the consumable data in response to the digital signature being validated.

The consumable data comprises an identifier for the consumable, and determining whether to approve the consumable may comprise comparing the identifier to a list of identifiers.

The computing device may be further configured to provide a notification to the user based on the determination whether to approve the consumable. The notification may be provided to the user in response to determining not to approve the consumable.

The computing device may be further configured to verify an age of a user of the aerosol provision system based on information associated with the user. The computing device may be further configured to provide a notification to the user based on the verifying the age of the user.

The computing device may be further configured to provide a notification to a user of the aerosol provision system based on the validating of the digital signature. The notification may be provided to the user in response to the validating indicating that the consumable is not authentic.

The code may be located on the consumable.

The computing device may be further configured to provide a notification to a user of the aerosol provision system in response to the reading the code not being unsuccessful. The notification may indicate to the user to capture a second image containing the code. The notification may indicate to the user to capture a second image containing a different code, and the different code may be located on packaging for the consumable.

The computing device may be further configured to send an instruction to the aerosol provision system in response to determining whether to approve the consumable. The instruction may be sent to the aerosol provision system in response to determining to approve the consumable. The instruction may comprise one or more operational parameters for the aerosol provision system. The one or more operational parameters may comprise an enabling of an aerosol generator of the aerosol provision system. The enabling of the aerosol generator may be for a number of inhalations by a user of the aerosol provision system.

The computing device may further comprise a camera configured to capture the image.

In accordance with some embodiments described herein, there is provided a method of approving a consumable of an aerosol provision system comprising receiving an image containing a code associated with the consumable, reading the code to generate consumable data and a digital signature, validating the digital signature using a public key of a key pair, and determining whether to approve the consumable based on the consumable data in response to the digital signature being validated.

There is also provided a computer readable storage medium comprising instructions which, when executed by a processor, performs the above method.

In accordance with some embodiments described herein, there is provided an aerosol provision device comprising the computing device as described herein.

In accordance with some embodiments described herein, there is provided a system comprising the computing device as described herein and an aerosol provision device.

These aspects and other aspects will be apparent from the following detailed description. In this regard, particular sections of the description are not to be read in isolation from other sections.

BRIEF DESCRIPTION OF DRAWINGS

Embodiments of the disclosure will now be described, by way of example only, with reference to accompanying drawings, in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of consumables and systems discussed herein which are not described in detail may be implemented in accordance with any conventional techniques for implementing such aspects and features.

The present disclosure relates to aerosol provision systems, which may also be referred to as aerosol provision systems, such as e-cigarettes. Throughout the following description the term "e-cigarette" or "electronic cigarette" may sometimes be used, but it will be appreciated this term may be used interchangeably with aerosol provision system and electronic aerosol provision system.

As noted above, aerosol provision systems (e-cigarettes) often comprise a modular assembly including both a reusable part (aerosol provision device) and a replaceable (disposable) or refillable cartridge part, referred to as a consumable. Systems conforming to this type of two-part modular configuration may generally be referred to as two-part systems or devices. It is also common for electronic cigarettes to have a generally elongate shape. For the sake of providing a concrete example, certain embodiments of the disclosure described herein comprise this kind of generally elongate two-part system employing refillable cartridges. However, it will be appreciated the underlying principles described herein may equally be adopted for other electronic cigarette configurations, for example modular systems comprising more than two parts, as devices conforming to other overall shapes, for example based on so-called box-mod high performance devices that typically have a more boxy shape.

As described above, the present disclosure relates to (but it not limited to) refilling devices for consumables of aerosol provision systems, such as e-cigarettes and electronic cigarettes.

Figure 1:
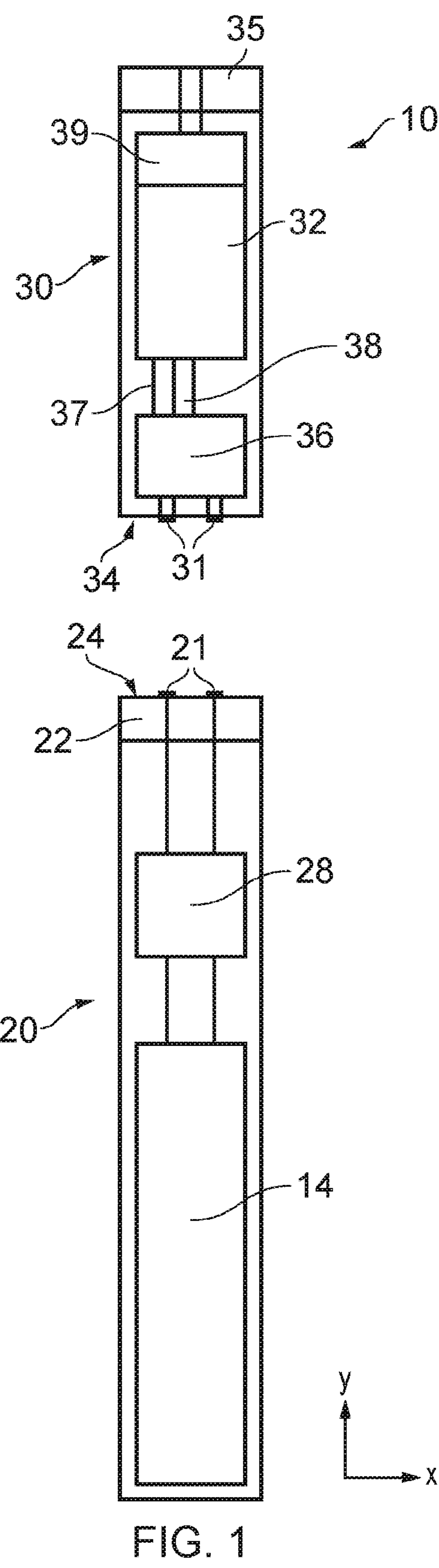
FIG. 1 is a schematic diagram of an aerosol provision system.

FIG. 1 is a highly schematic diagram (not to scale) of an example aerosol provision system 10, such as an e-cigarette, to which embodiments are applicable. The aerosol provision system 10 has a generally cylindrical shape, extending along a longitudinal or y axis as indicated by the axes (although aspects of the disclosure are applicable to e-cigarettes configured in other shapes and arrangements), and comprises two main components, namely an aerosol provision device 20 and a consumable 30.

The consumable 30 comprises or consists of aerosol-generating material 32, part or all of which is intended to be consumed during use by a user. A consumable 30 may comprise one or more other components, such as an aerosol-generating material storage area 39, an aerosol-generating material transfer component 37, an aerosol generation area, a housing, a wrapper, a mouthpiece 35, a filter and/or an aerosol-modifying agent.

A consumable 30 may also comprise an aerosol generator 36, such as a heating element, that emits heat to cause the aerosol-generating material 32 to generate aerosol in use. The aerosol generator 36 may, for example, comprise combustible material, a material heatable by electrical conduction, or a susceptor. It should be noted that it is possible for the aerosol generator 36 to be part of the aerosol provision device 20 and the consumable 30 then may comprise the aerosol-generating material storage area 39 for the aerosol-generating material 32 such that, when the consumable 30 is coupled with the aerosol provision device 20, the aerosol-generating material 32 can be transferred to the aerosol generator 36 in the aerosol provision device 20.

Aerosol-generating material is a material that is capable of generating aerosol, for example when heated, irradiated or energized in any other way. The aerosol-generating material 32 may, for example, be in the form of a solid, liquid or gel which may or may not contain an active substance and/or flavorants. In some embodiments, the aerosol-generating material 32 may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it. In some embodiments, the aerosol-generating material 32 may for example comprise from about 50 wt %, 60 wt % or 70 wt % of amorphous solid, to about 90 wt %, 95 wt % or 100 wt % of amorphous solid.

The aerosol-generating material comprises one or more ingredients, such as one or more active substances and/or flavorants, one or more aerosol-former materials, and optionally one or more other functional materials such as pH regulators, coloring agents, preservatives, binders, fillers, stabilizers, and/or antioxidants.

The active substance as used herein may be a physiologically active material, which is a material intended to achieve or enhance a physiological response. The active substance may for example be selected from nutraceuticals, nootropics, and psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, cannabis or another botanical.

In some embodiments, the active substance comprises nicotine. In some embodiments, the active substance comprises caffeine, melatonin or vitamin B12.

The aerosol provision device 20 includes a power source 14, such as a battery, configured to supply electrical power to the aerosol generator 36. The power source 14 in this example is rechargeable and may be of a conventional type, for example of the kind normally used in electronic cigarettes and other applications requiring provision of relatively high currents over relatively short periods. The power source 14 may be recharged through the charging port (not illustrated), which may, for example, comprise a USB connector.

The aerosol provision device 20 includes device control circuitry 28 configured to control the operation of the aerosol provision system 10 and provide conventional operating functions in line with the established techniques for controlling aerosol provision systems such as electronic cigarettes. The device control circuitry (processor circuitry) 28 may be considered to logically comprise various sub-units/circuitry elements associated with different aspects of the electronic cigarette's operation. For example, depending on the functionality provided in different implementations, the device control circuitry 28 may comprise power source control circuitry for controlling the supply of electrical power from the power source 14 to the aerosol generator 36, user programming circuitry for establishing configuration settings (e.g. user-defined power settings) in response to user input, as well as other functional units/circuitry associated functionality in accordance with the principles described herein and conventional operating aspects of electronic cigarettes. It will be appreciated the functionality of the device control circuitry 28 can be provided in various different ways, for example using one or more suitably programmed programmable computer(s) and/or one or more suitably configured application-specific integrated circuit(s)/circuitry/chip(s)/chipset(s) configured to provide the desired functionality.

The aerosol provision device 20 has an interface 22 configured to receive the consumable 30, thereby facilitating the coupling between the aerosol provision device 20 and the consumable 30. As illustrated in FIG. 1, the interface 22 is located on a surface 24 of the aerosol provision device 20.

The housing of the consumable 30 has a surface 34 configured to be received by the interface 22 on the aerosol provision device 20 in order to facilitate coupling between the consumable 30 and the aerosol provision device 20. The surface 34 of the consumable may be configured to be a size and/or shape that mirrors the size and/or shape of the interface 22 in order to facilitate coupling between the aerosol provision device 20 and the consumable 30. For example, the interface 22 may comprise a cavity, chamber or other space on the surface 24 of the aerosol provision device 20. The surface 34 of the consumable 30 can then be configured to be a size and shape that mirrors the size and shape of the cavity in order for the surface 34 of the consumable 30 to be inserted into the cavity.

Although not illustrated, the interface 22 of the aerosol provision device 20 and the surface 34 of the consumable 30 may have complementary features to reversibly attach and mate the consumable 30 to the aerosol provision device 20, such as a screw thread, bayonet fitting, latched or friction fit fixing or other fastening means.

The interface 22 also comprises one or more connectors 21, such as contact electrodes, connected via electrical wiring to the control circuitry 28 and the power source 14. The consumable 30 also comprises one or more connectors 31, such as contact electrodes, connected via electrical wiring to the aerosol generator 36. In use, the consumable 30 is received by the interface 22 of the aerosol provision device 20, thereby coupling the aerosol provision device 20 and the consumable 30. This results in the connectors 31 on the consumable 30 mating with the connectors 21 on the aerosol provision device 20, thereby allowing electrical power and electrical current to be supplied from the power source 14 of the aerosol provision device 20 to the aerosol generator 36 of the consumable 30.

The housing of the consumable 30 has a surface 34 configured to engage with an interface 22 on the aerosol provision device 20 in order to facilitate coupling between the consumable 30 and the aerosol provision device 20. In other words, the aerosol provision device 20 is configured to receive the consumable 30, via the interface 22, and the surface 34 of the consumable is proximate to the interface 22 on the aerosol provision device 20 when the consumable 20 is received by the interface 22.

The aerosol provision system 10 includes one or more air inlets (not illustrated), located on one or more of the aerosol provision device 20 and the consumable 30. In use, as a user inhales on the mouthpiece 35, air is drawn into the aerosol provision system 10 through the air inlets and along an air channel 38 to the aerosol generator 36, where the air mixes with the vaporized aerosol-generating material 32 and forms a condensation aerosol. The air drawn through the aerosol generator 36 continues along the air channel 38 to a mouthpiece carrying some of the aerosol with it, and out through the mouthpiece 35 for inhalation by the user.

By way of a concrete example, the consumable 30 comprises a housing (formed, e.g., from a plastics material), an aerosol-generating material storage area 39 formed within the housing for containing the aerosol-generating material 32 (which in this example may be a liquid which may or may not contain nicotine), an aerosol-generating material transfer component 37 (which in this example is a wick formed of e.g., glass or cotton fibers, or a ceramic material configured to transport the liquid from the reservoir using capillary action), an aerosol-generating area containing the aerosol generator 36, and a mouthpiece 35. Although not shown, a filter and/or aerosol modifying agent (such as a flavor imparting material) may be located in, or in proximity to, the mouthpiece 35. The aerosol generator 36 of this example comprises a heater element formed from an electrically resistive material (such as NiCr8020) spirally wrapped around the aerosol-generating material transfer component 37, and located in an air channel 38. The area around the heating element and wick combination is the aerosol-generating area of the consumable 30.

Figure 2:
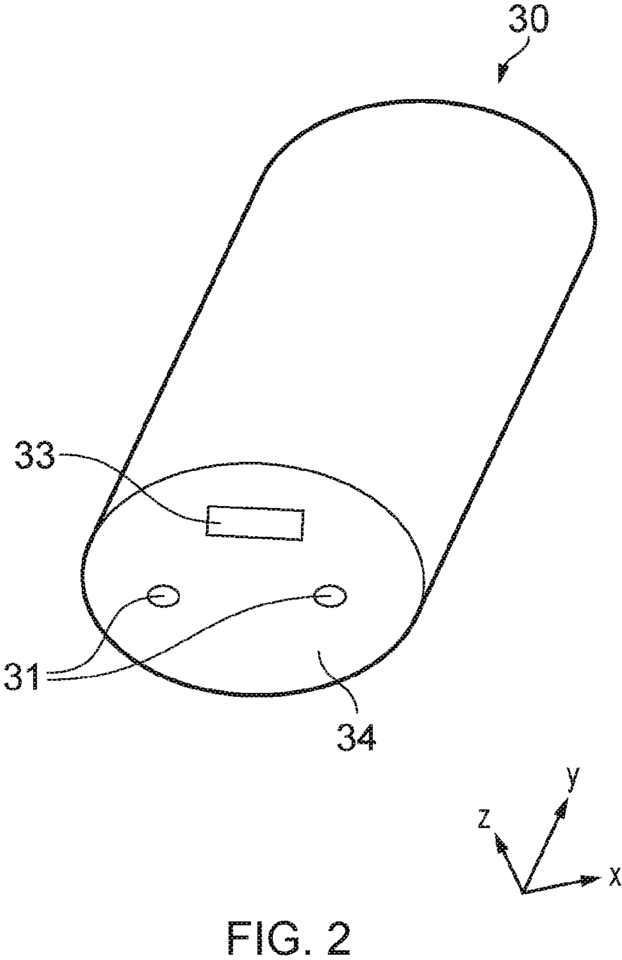
FIG. 2 is a schematic diagram of an example consumable for use in the aerosol provision system illustrated in FIG. 1.

FIG. 2 is a schematic diagram of an example consumable 30 for use in the aerosol provision system 10 illustrated in FIG. 1, where the same reference signs have been used for like elements between the consumable 30 illustrated in FIG. 1 and the consumable 30 illustrated in FIG. 2.

As described above, the consumable 30 has a surface 34 configured to be received by the interface 22 of the aerosol provision device 20. The one or more connectors 31 of the consumable are located on the surface 34 of the consumable in order to facilitating mating with the connectors 21 on the aerosol provision device 20 as described above. The consumable illustrated in FIG. 2 also comprises a code 33, for example located on the surface 34 of the consumable 30. The code 33 may be printed, etched, glued or otherwise adhered to the surface 34 of the consumable.

Figure 3:
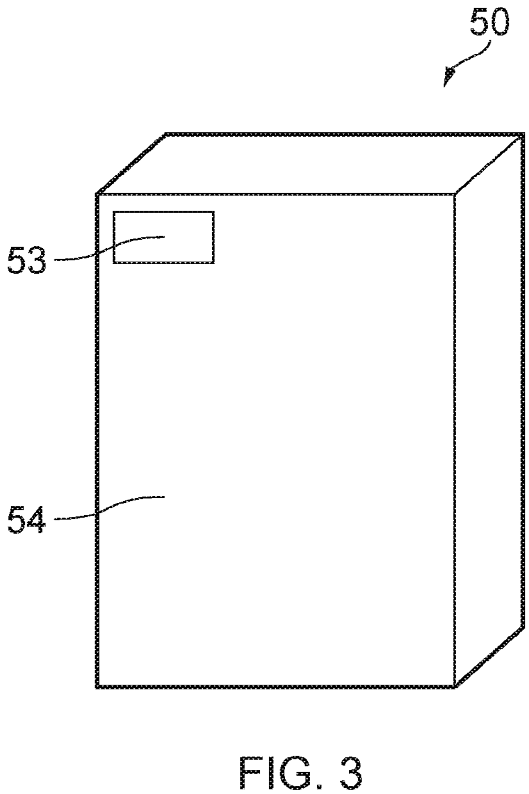
FIG. 3 is a schematic diagram of an example packaging for a consumable of an aerosol provision system.

FIG. 3 is a schematic diagram of an example packaging 50 for a consumable 30 of an aerosol provision system 10, such as the consumable 30 illustrated in FIG. 2. The packaging comprises a code 53, for example located on an exterior surface 54 of the packaging 50. The code 53 may be printed, etched, glued or otherwise adhered to the surface 54 of the packaging 50.

The codes 33, 53 are generated or otherwise encoded with consumable data and a digital signature. The digital signature is generated using a private key of a key pair. The private key is held by the manufacturer of the consumable 30 and/or the packaging 50, or by the entity responsible for generating and printing the codes 33, 53 on the consumable 30 and/or the packaging 50. The private key is not distributed further.

The consumable data represents information associated with the consumable 30. In the example illustrated in the FIG. 2 where a code 33 is on the consumable 30, the consumable data represents information associated with the consumable 30 that contains the code. In the example illustrated in FIG. 3 where a code 53 is on the packaging 50, the consumable data can represent information associated with one or more of the consumables contained in the packaging 50. For example, the consumable 30 data may relate to all of the consumables in the packaging 50, or a subset of the consumables 30 in the packaging. In the latter case, multiple codes 53 may be present on the packaging 50, where each code 53 is generated using consumable data for a different subset of consumables 30 in the packaging 50. For example, if the packaging 50 is configured to hold five consumables 30, there may be five codes 53 on the packaging, where each code 53 is generated using consumable data for a different consumable 50 in the packaging. Alternatively, there may be two, three or four codes, where each code 53 is generated using consumable data for a different subset of consumables 30 in the packaging 50, or there may be one code 53 generated using consumable data for every consumable 30 in the packaging 50. The number of codes 53 present on the packaging 50 may be dependent upon the nature of the consumables 30 in the packaging 50, for example if one or more of the consumables 30 contains a different ingredient, flavorant or concentration of an ingredient, or if each consumable 30 in the packaging 50 is the same. Where one or more of the consumables 30 in the packaging 50 contains a different ingredient, flavorant or concentration of an ingredient, the number of codes 53 on the packaging 50 may reflect the number of different ingredients, flavorants or concentrations of ingredients present in the consumable 30 in the packaging, for example where each code 53 is generated using consumable data for a subset of the consumables 30, where the consumables 30 in each subset have the same ingredient, flavorant or concentration of an ingredient.

In some examples, the consumable data includes an identifier for the consumable 30, such as a serial number or other means of uniquely identifying the consumable 30. Where the code 33 is present on the consumable 30, this results in the code 33 on the consumable being unique to the consumable 30 it is present on. Where the code 53 is present on the packaging 50, the consumable data may include an identifier for each consumable 30 in the packaging 50, or a subset of the consumables 30. As described above, the number of codes 53 present on the packaging 50 may then relate to the number of identifiers present in the consumable data used to generate each code. For example, where the consumable data includes an identifier for each consumable 30 in the packaging 50, only one code 53 may be present on the packaging 50. Where the consumable data includes an identifier for a single consumable 30, the number of codes on the packaging 50 may correspond to the number of consumables 30 in the packaging.

The consumable data can also include a stock keeping unit (SKU) for the consumable 30. The SKU may contain additional information associated with the consumable 30, such as a date of manufacture and/or expiry of the consumable 30, a type of the consumable 30, a batch number of the consumable 30, and/or one or more types of aerosol provision device 20 the consumable 30 is configured to be used with. The SKU may also contain data relating to the aerosol-generating material 32, such an amount of aerosol-generating material 32 stored in the aerosol-generating material storage area 39, one or more ingredients, one or more active substances, the concentration and/or amount of the ingredients, active substances and/or one or more flavorants within the aerosol-generating material 32.

The codes 33, 53 are generated by conventional means based on the particular implementation and type of code 33, 53 used. The code 33 on the consumable 30 and the code 53 on the packaging 50 may be a one dimensional (1D) or linear code, such as a barcode, a two-dimensional (2D) code or matrix code, such as an Azte code, data matrix or QR code, or a three-dimensional (3D) code, such as a 3D barcode or a colored QR code. The code 33 on the consumable 30 and the code 53 on the packaging 50 may be the same type of code, or they may be different. For example the code 33 on the consumable and the code 53 on the packaging 50 may both be QR codes, or the code 33 on the consumable may be a 3D code whilst the code 53 on the packaging 50 may be a 2D code.

The size of the code is dependent upon the size and amount of data contained within the consumable data and the digital signature. For example, the identifier for the consumable 30 could be implemented as 24 bits, thereby allowing for approximately 16.7 million unique identifiers and consumables 30. The SKU could be implemented as 16 bits, for example allowing a combination of 4 different active substances, 8 different concentrations of ingredient, 50 different flavorants and 20 different types of consumable 30 and/or aerosol provision device 20 to be represented in the SKU. The digital signature could then be implemented as 16 bits, given a total size of 56 bits (or seven 8-bit characters) for the code 33, 53. This could then be represented, for example, on a 12×12 data matrix (with physical dimensions of between 2 mm square and 5 mm square) or a 3 cm square QR code.

It will be appreciated, however, that the code 33, 53 may be smaller or larger depending on the amount of data contained within the consumable data and the digital signature. As described above, the code 33 on the consumable 30 and the code 53 on the packaging 50 may be the same type of code, or they may be different. It will be appreciated that the physical size of the surface 34 of the consumable 30 may be substantially smaller than the physical size of the surface 54 of the packaging 50. Accordingly, the code 33 on the consumable 30 and the code 53 on the packaging 50 may be the same type of code, but with different physical dimensions. Alternatively, the types of code may be different. For example, the code 33 on the consumable 30 may be a 2 mm square data matrix whilst the code 53 on the packaging 50 may be a barcode with physical dimensions complying with a relevant standard.

Figure 4:
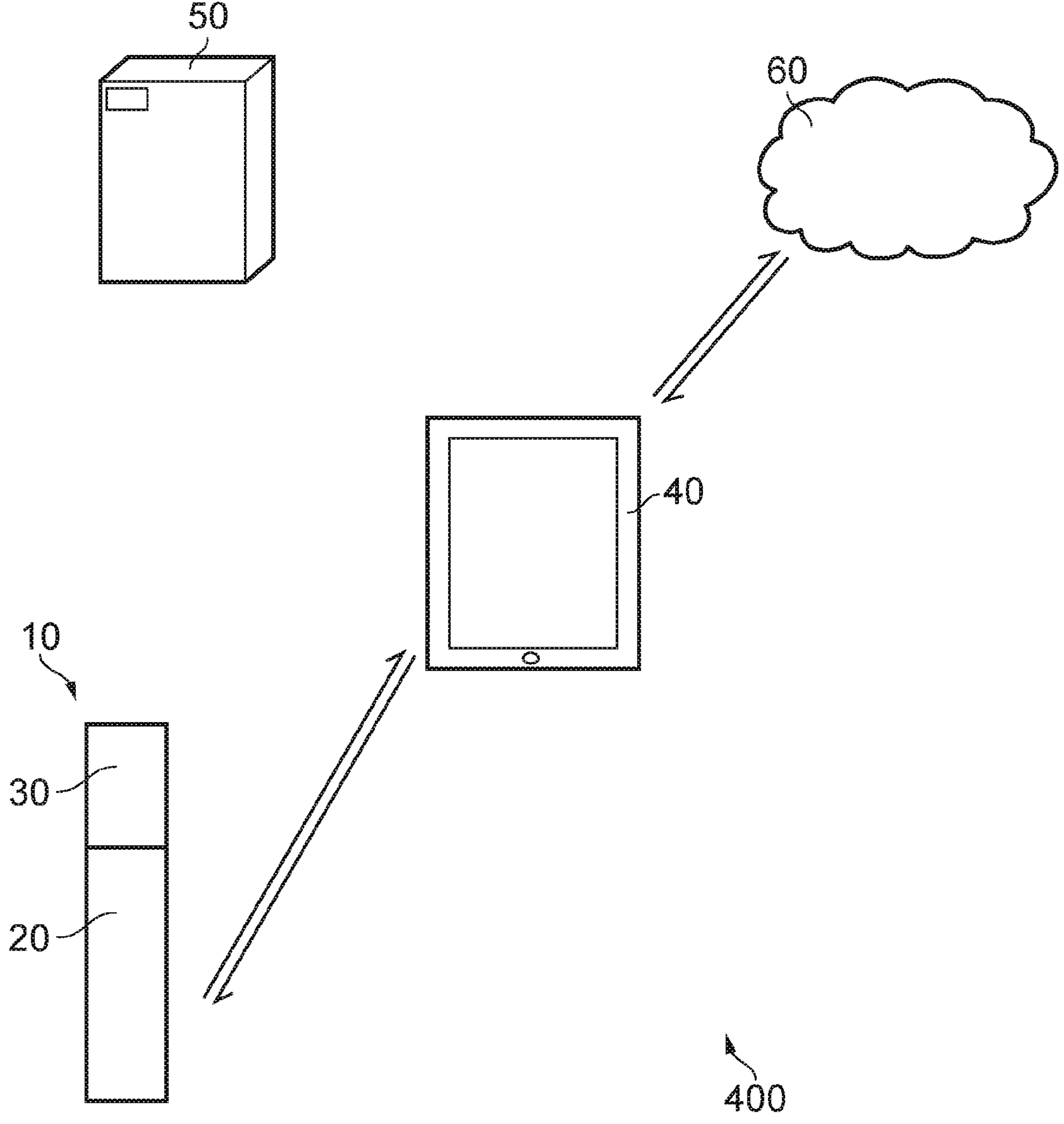
FIG. 4 is a schematic diagram of a system including an aerosol provision device.

FIG. 4 is a schematic diagram of a system 400 comprising the aerosol provision device 20, the consumable 30, the packaging 50 and a computing device 40. The aerosol provision device 20 is configured to communicate with the computing device 40 using a wireless communication protocol, such as Wi-Fi, Bluetooth, Bluetooth Low Energy (BLE), ANT+, using a cellular network or any other suitable wireless communication method. The computing device 40 is also configured to communicate with a remote data store 60 using a wireless communication protocol, such as such as Wi-Fi, Bluetooth, Bluetooth Low Energy (BLE), ANT+, using a cellular network or any other suitable wireless communication method. The user of the aerosol provision system 10 may also be the user of the computing device 40, and in order for the aerosol provision device 20 to be able to communicate with the computing device 40, the user of the aerosol provision system 10 may be required to authenticate themselves and/or the aerosol provision device 20 with the computing device 40. For example, in order to establish a Wi-Fi or Bluetooth connection between the aerosol provision device 20 and the computing device 40, the user of the aerosol provision system 10 may be required to install an application or software provided by the manufacturer of the aerosol provision system 10 on the computing device 40 and verify the identity of the user and/or the aerosol provision system 10.

The computing device 40 may include any suitable electronic device that can be communicatively coupled to the aerosol provision device 20. For example, the computing device 40 may include a mobile device (such as a smartphone), a PDA, a personal computer, laptop, tablet, smartwatch, etc. The computing device 40 is configured to perform functions a described below, for example by suitable software instruction executed on one or more processors. The functions described below may be performed by an application installed and operating on the computing device 40.

The computing device 40 is configured to receive an image containing a code 33, 53 associated with a consumable 30 of an aerosol provision system 10. As described above in relation to FIGS. 2 and 3, the code 33, 53 may be present on the consumable 30 and/or the packaging 50.

In the example where the code 33 is present on the consumable 30, the aerosol provision device 20 comprises a camera configured to image a surface 34 of the consumable 30. The control circuitry 28 is configured to instruct the camera to capture an image of the surface 34 of the consumable 30 in response to the consumable 30 being received by the interface 22 of the aerosol provision device 20, and to send the image to the computing device 40. Accordingly, in this case the image is received by the computing device 40 from the aerosol provision device 20, and the camera which captured the image is located on the aerosol provision device 20.

In the example where the code 53 is present on the packaging 50, the image is may be captured by a camera associated with the computing device 40. For example, the camera may be integrated with, and form part of the computing device 40, such as a camera phone or a webcam. Alternatively, the camera may be in wireless communication with the computing device, such as by Wi-Fi, Bluetooth or any other suitable wireless communication method, or the camera may be separable from the computing device and temporarily connected to the computing device 40 using a wired interface, such as USB or HDMI, in order to transfer the image from the camera to be received by the computing device 40.

In response to receiving the image containing a code 33, 53, the computing device 40 is configured to read the code to generate the consumable data and the digital signature. In other words, the computing device decodes the code 33, 53 using a suitable scanning or reading means based on the type of code as described above. As a preliminary step, the computing device 40 may identify or otherwise detect the code 33, 53 within the image using conventional image processing techniques. This identifying step may also allow the computing device 40 to determining the appropriate means of reading or decoding the code 33, 53.

In some examples, the computing device 40 may be unable to identify a code within the image, or the computing device 40 may be unable to decode the code. In other words, the reading of the code in the image by the computing device 40 is not successful. In response to the reading the code not being successful, the computing device 40 may be configured to provide a notification to the user of the aerosol provision system 10. Alternatively or in addition, the computing device 40 may be configured to provide a notification to the user of the aerosol provision system 10 in response to the computing device 40 failing to identify or detect a code 33, 53 in the image.

The notification may be provided on the aerosol provision system 10. In this case, the computing device 40 is configured to transmit instructions to the aerosol provision device 20 to provide the notification to the user. The notification may be provided by activating an indicator light, emitting a sound from a speaker or displaying a message on a display screen on the aerosol provision device 20 and/or the consumable 30. The notification may also be a haptic notification on the aerosol provision system 10, such as a vibration or force feedback. For example, a vibration may be generated by an eccentric rotating mass (ERM) or piezoelectric actuator within the aerosol provision device 20 and/or the consumable 30, or a force may be generated by a motor within the aerosol provision device 20 and/or the consumable 30.

Alternatively, the notification may be provided on the computing device 40, such as on an application installed on the computing device 40. For example, a message may be displayed on a display screen on the computing device 40, an indicator light activated, a sound emitted from a speaker or a haptic notification means on the computing device 40 as described above. The notifications on the computing device 40 may be push notifications, or may be a passive notification.

The notification may indicate to the user to capture a second image containing the code 33, 53. For example, where the image was captured using a camera imaging the packaging 50 for the consumable 30, the notification may indicate to the user to take another image of the packaging 50. The notification may indicate to the user to perform one or more actions before the second image is captured. For example, where the image was captured by camera on the aerosol provision device 20 imaging the consumable 30, the computing device 40 being unable to detect a code 33 in the image may indicate that the consumable 30 was not properly inserted into the aerosol provision device 20, thereby preventing the camera from imaging the code 33, as the code 33 may not have been in the field of view of the camera. Alternatively, where the image was captured by a camera on the aerosol provision device 20 or associated with the computing device 40, the computing device 40 may have been able to detect a code in the image, but not read or otherwise decode the code 53, 33 because the image was blurred, out of focus, grainy of otherwise unclear. The notification to the user may therefore indicate that the lens of the camera requires a clean before the second image is captured, or that the camera needs to be held more securely or otherwise prevented from moving whilst the second image is captured.

The notification may indicate to the user to capture a second image containing a different code. For example, where the image was captured by a camera on the aerosol provision device 20 imaging the code 33 on the consumable 30, the notification may indicate to the user to capture an image of the code 53 on the packaging 50, for example using the camera associated with the computing device 40 instead of the camera 30 on the aerosol provision device 20. Where the image was captured by a camera associated with the computing device imaging a code 53 on the packaging, the notification may indicate to the user to capture an image of a different code 53 on the packaging 50.

Alternatively or in addition, the computing device 40 may be configured to instruct the camera to capture a second image of the code in response to the decoding indicating the code was not successfully decoded. For example, the computing device 40 may instruct the control circuitry 28 of the aerosol provision device 20 to capture a second image of the code 33 on the consumable 30. Alternatively, the computing device 40 may provide an indication to the control circuitry 28 of the aerosol provision device 20 that the code was not successfully decoded. In other words, the computing device 40 provides an indication that the image and/or the code 33 has not been successfully read to the control circuitry 28 of the aerosol provision device 20.

Having decoded the code 33, 53 to generate the consumable data and the digital signature, the computing device 40 is configured to validate the digital signature using a public key of the key pair. As described above, the digital signature is generated using the private key of the key pair. The public key of the key pair is provided to the computing device 40, for example as part of an application complied by the owner of the private key (the manufacturer of the consumable 30 and the packaging 50, or by the entity responsible for generating and printing the codes 33, 53 on the consumable 30 and the packaging 50). The public key is then used to validate the digital signature, thereby indicating that the code 33 on the consumable 30 and/or the code 53 on the packaging 50 is authentic. In other words, if the computing device 40 is unable to validate the digital signature, this indicates that the code was not generated by the owner of the private key (the manufacturer of the consumable 30 and the packaging 50, or by the entity responsible for generating and printing the codes 33, 53 on the consumable 30 and the packaging 50), and therefore that the consumable 30 comprising the code and/or the consumables contained within the packaging 50 comprising the code 53 are not authentic. If the digital signature is validated (in other words, if the digital signature is successfully validated), this indicates that the code was generated by the owner of the private key, and therefore that the consumable 30 comprising the code and/or the consumables contained within the packaging 50 comprising the code 53 are authentic.

The computing device 40 may be configured to provide a notification to the user of the aerosol provision system based on the validating of the digital signature. For example, the notification may be provided in response to the validating indicating that the consumable is not authentic as described above. Alternatively, a notification may be provided to the user indicating whether or not the consumable 30 is authentic; in other words whether or not the digital signature was successfully validated.

The notification may be provided on the aerosol provision system 10. In this case, the computing device 40 is configured to transmit instructions to the aerosol provision device 20 to provide the notification to the user. The notification may be provided by activating an indicator light, emitting a sound from a speaker or displaying a message on a display screen on the aerosol provision device 20 and/or the consumable 30. The notification may also be a haptic notification on the aerosol provision system 10 as described above.

Alternatively, the notification may be provided on the computing device 40, such as on an application installed on the computing device 40. For example, a message may be displayed on a display screen on the computing device 40, an indicator light activated, a sound emitted from a speaker or a haptic notification means on the computing device 40 as described above. The notifications on the computing device 40 may be push notifications, or may be a passive notification.

In response to the digital signature being validated, the computing device 40 is configured to determine whether to approve the consumable 30 based on the consumable data. As described above, the consumable data can comprise an identifier for the consumable and therefore the computing device 40 can determine whether to approve the consumable 30 based on the identifier. For example, the computing device 40 can compare the identifier to a list of identifiers.

The list of identifiers may contain a list of identifiers that are approved to be used, for example approved by the manufacturer of the consumable 30 and the packaging 50 and provided to the computing device 40, for example with the public key. In this case, the identifier for the consumable 30 is compared to the list of identifiers, and the consumable 30 is approved if the identifier is contained within the list of identifiers. In other words, computing device 40 determines to approve the consumable 30 if the identifier is contained within the list of identifiers. If the identifier is not contained within the list of identifiers, the consumable 30 is not approved. In other words, computing device 40 determines not to approve the consumable if the identifier is not contained within the list of identifiers. In the example described above where the code 53 on the packaging 50 is generated with consumable data for more than one consumable 30, the computing device 40 may be configured to approve the consumable if one or all of the identifiers in the consumable data used to generate the code 53 is present in the list of identifiers.

Alternatively, the list of identifiers may contain a list of identifiers that have already been used. In other words, the list of identifiers contains the identifiers for expired consumables 30 that should no longer be used. In this case, the identifier for the consumable 30 is compared to the list of identifiers, and the consumable 30 is approved if the identifier is not contained within the list of identifiers. In other words, computing device 40 determines to approve the consumable 30 if the identifier is not contained within the list of identifiers. The computing device 40 may then be configured to add the identifier to the list of identifiers, thereby indicating that the consumable 30 has been approved for use and that the corresponding identifier is not to be used again to approve a consumable 30. In the example described above where the code 53 on the packaging 50 is generated with consumable data for more than one consumable 30, the computing device 40 may be configured to approve the consumable if one of the identifiers in the consumable data used to generate the code 53 is not present in the list of identifiers. That one identifier is then added to the list of identifiers to indicate that it has been used to approve consumable. This then allows the code on the packaging to be used to approve each consumable in the packaging in turn.

The list of identifiers may be stored on the computing device 40 or at another location, such as the remote data store 60. In the case where the list of identifiers is stored at the remote data store 60, the computing device 40 may be configured to send the identifier to the remote data store 60 in order for the identifier to be compared to the list of identifiers by the remote data store 60, or the computing device 40 may be configured to perform the comparing operation, for example by using a look-up operation. The computing device 40 may then be configured to update the list of identifiers stored at the remote data store 60 in response to the consumable 30 being approved (i.e. the determination whether to approve the consumable 30 determining that the consumable 30 is to be approved), either by instructing the remote data store 60 to add the identifier to the list of identifiers, or by adding the identifier to the list of identifiers by the computing device 40.

In the case where the list of identifiers is stored on the computing device 40, the computing device 40 may be configured to receive an updated list of identifiers, either periodically or in response to a requested from the computing device 40 for an updated list of identifiers. The computing device 40 may then be configured to update the list of identifiers stored in response to the consumable 30 being approved (i.e. the determination whether to approve the consumable 30 determining that the consumable 30 is to be approved).

As described above, the consumable data may also comprise a SKU. In this case, the approving of the consumable may also be based on the SKU. For example, the consumable 30 may only be approved by the computing device if the date of expiry of the consumable 30 has not passed, if the type of consumable 30 is compatible with the aerosol provision device and/or if the batch number of the consumable 30 has been already been used. In the example described above where the code 53 on the packaging 50 is generated with consumable data for more than one consumable 30, the computing device 40 may be configured, for example, to only approve the consumable if the date none of the dates of expiry for the consumables 30 have passed, if all of the types of consumable 30 are compatible with the aerosol provision device 20, and/or if the batch number of none of the consumables 30 have been already been used.

The computing device 40 may be configured to provide a notification to the user of the aerosol provision system based on the determination whether to approve the consumable. For example, the notification may be provided in response to the approving indicating that the consumable 30 is not approved (i.e. the determination whether to approve the consumable 30 determining that the consumable 30 is not to be approved) as described above. The notification may also provide an indication as to why the consumable 30 was not approved, for example an indication that the consumable 30 has already been used, an indication that the consumable 30 is not approved by the manufacturer, an indication that the date of expiry of the consumable as passed and/or an indication that the consumable 30 is not compatible with aerosol provision device 20. Alternatively, a notification may be provided to the user indicating whether or not the consumable 30 is approved, for example whether or not the consumable 30 has been used before. In the example described above where there are multiple codes 53 on the packaging 50, when the consumable 30 has not been approved, the notification may indicate to the user to capture a second image of a different code 53 on the packaging 50, as the code 53 in the first image captured may have already been used to approve a consumable 30, and therefore that code 53 may not be able to be used again to approve a consumable 30.

The notification may be provided on the aerosol provision system 10. In this case, the computing device 40 is configured to transmit instructions to the aerosol provision device 20 to provide the notification to the user. The notification may be provided by activating an indicator light, emitting a sound from a speaker or displaying a message on a display screen on the aerosol provision device 20 and/or the consumable 30. The notification may also be a haptic notification on the aerosol provision system 10 as described above.

Alternatively, the notification may be provided on the computing device 40, such as on an application installed on the computing device 40. For example, a message may be displayed on a display screen on the computing device 40, an indicator light activated, a sound emitted from a speaker or a haptic notification means on the computing device 40 as described above. The notifications on the computing device 40 may be push notifications, or may be a passive notification.

Before determining whether to approve the consumable 30, the computing device 40 may be configured to verify an age of the user of the aerosol provision system 10 based on information associated with the user. For example, as described above, the user of the aerosol provision system 10 may be required to verify their identity in order for the computing device 40 to be able to communicate with the aerosol provision device 20. As part of this verification process, the user may be required to create a profile and provide information associated with themselves, such as their age, their date of birth and/or their geographic location. This information associated with the user may be stored on the computing device 40, the aerosol provision system 10 (for example the aerosol provision device 20) or on the remote data store 60. The computing device 40 may then be configured to use the information associated with the user to verify the age of the user. For example, the age or date of birth of the user may be used to determine the age of the user. In some cases, the age of the user may be compared to an age limit to determine whether the user is old enough to use the aerosol provision system 10. The geographic location of the user may be used to determine the age limit associated with the geographic location of the user. The geographical location of the user may be determined by the computing device 40 as part of verifying the age of the user. For example, the computing device 40 may use GPS, an IP address of the computing device or other geolocation means may be used to determine the geographical location of one or more of the computing device 40, the aerosol provision device 20 and the user. Equally, the user may be prompted to provide the current location, for example by inputting their location on an input device of the computing device 40. The geographical location is then used to determine the age limit for the geographical location. It will be appreciated that age limits and laws will vary from location to location (such as from country to country, and state to state). The age limit may be determined by looking up a list of age limits, stored on the computing device 40 and/or the remote data store 60. If it is determined that the user's age is below the age limit, the age of the user is not verified (in other words, the user is under age). Otherwise, if it is determined that the user's age is above or equal to the age limit, the age of the user is verified. The computing device may then be configured to perform the step of determining whether to approve the consumable

30 in response to the age of the user being verified. If the age of the user is not verified, the consumable is not approved, and/or the step of determining whether to approve the consumable 30 is not performed.

The computing device 40 may be configured to provide a notification to the user of the aerosol provision system 10 based on the verifying the age of the user. For example, the notification may be provided in response to the age of the user not being verified. The notification may indicate that the user is under age. Alternatively, a notification may be provided to the user indicating whether or not the age of the user was verified, for example whether or not the user meets the age limit for the geographical location of the user.

The notification may be provided on the aerosol provision system 10. In this case, the computing device 40 is configured to transmit instructions to the aerosol provision device 20 to provide the notification to the user. The notification may be provided by activating an indicator light, emitting a sound from a speaker or displaying a message on a display screen on the aerosol provision device 20 and/or the consumable 30. The notification may also be a haptic notification on the aerosol provision system 10 as described above.

Alternatively, the notification may be provided on the computing device 40, such as on an application installed on the computing device 40. For example, a message may be displayed on a display screen on the computing device 40, an indicator light activated, a sound emitted from a speaker or a haptic notification means on the computing device 40 as described above. The notifications on the computing device 40 may be push notifications, or may be a passive notification.

In response to the determining whether to approve the consumable 30, the computing device 40 may be configured to send one or more instructions to the aerosol provision system for example the aerosol provision device 20. As described above, the instructions sent to the aerosol provision device 20 may be to provide the notification to the user of the aerosol provision system 10. The instructions may only be sent to the aerosol provision system 10 in response to the consumable 30 being approved (i.e. in response to the determination whether to approve the consumable 30 determining that the consumable 30 is to be approved), or instructions may be sent to the aerosol provision system 10 in response to the determining whether to approve the consumable 30 determining the consumable 30 is or is not approved, but the content of the instructions sent is different depending on whether the consumable 30 is or is not approved.

In some examples, the instructions comprise one or more operational parameters for the aerosol provision system 10. In other words, the computing device 40 is configured to send one or more operational parameters to the aerosol provision system 10 in response to determining whether to approve the consumable 30. The operational parameters may be at least one of an amount of power or current delivered from the power source 14 to the aerosol generator 36, an average or maximum temperature of the aerosol generator 36, and a temperature or power profile or setting for the aerosol generator 36. The operational parameters may be at least one setting for one or more indicator lights, speakers, display screens or haptic notification means on the aerosol provision device 20 and/or the consumable 30.

In some examples, the operational parameter is the enabling of the aerosol generator 36 of the aerosol provision system 10. For example, the control circuitry 28 of the aerosol provision device 20 may be configured to disable the aerosol generator 36 (in other words, prevent power or electrical current from being delivered to the aerosol generator 36 from the power source 14) until an instruction is received from the remote computing device 40 indicating that the aerosol generator 36 to be enabled, which is only sent by the remote computing device 40 in response to the determining whether to approve the consumable 30 determining that the consumable 30 is approved. In response to receiving the notification, the control circuitry 28 is then configured to provide power or electrical current from the power source 14 to the aerosol generator 36, thereby enabling the aerosol generator 36. This ensures that the consumable 30 received by the aerosol provision device 20 or the consumable 30 contained within the packaging 50 cannot be used with the aerosol provision device 20 until the code associated with the consumable 30 has been used to approve the consumable 30.

The control circuitry 28 of the aerosol provision device 20 may then be configured to disable the aerosol generator 36 again, for example after the consumable 30 has been detached from the aerosol provision device 20, after a predetermined amount of time or number of puffs on the aerosol provision system 10 by the user, or after the aerosol-generating material 32 has been depleted or otherwise used up. This ensures that any further consumables 30 received by the aerosol provision device 20 will require the same process of determining whether to approve a consumable 30 described above before they can be used. In some examples, the enabling of the aerosol generator 36 is for a particular period of time, such as 10 minutes, 1 hour or 24 hours. The control circuitry 28 is then configured to disable the aerosol generator 36 after the period of time has elapsed.

In the example described above where the code 53 on the packaging 50 is generated with consumable data for more than one consumable 30, the operational parameter may be the enabling of the aerosol generator 36 for a particular number of consumables, such as the number of consumables the consumable data represents and/or the number of consumables in the packaging 50. In response to receiving this instruction, the control circuitry 28 of the aerosol provision device 20 is then configured to enable the aerosol generator 36 and count the number of consumables that are received by the aerosol provision device 20 following the enabling of the aerosol generator 36. Once the number of consumables received by the aerosol provision device 20 exceeds the particular number of consumables in the instruction, the control circuitry 28 of the aerosol provision device 20 is configured to disable the aerosol generator 36.

In some examples, the enabling of the aerosol generator 36 is for a number of inhalations by a user of the aerosol provision system 10. In other words, the instruction sent by the computing device 40 to the aerosol provision system 10 indicates to enable the aerosol generator 36 for a particular number of inhalations or puffs, such as 5, 10, 50 or 100. After the user has performed the particular number of inhalations on the aerosol provision system the control circuitry 28 of the aerosol provision device 20 is then configured to disable the aerosol generator 36, thereby requiring the process of determining whether to approve a consumable 30 described above to be performed again before the aerosol generator 36 is enabled again. The particular number of inhalations may therefore be selected based on the number of inhalations typically performed by the user on the aerosol provision system 10 in order to use all of the aerosol-generating material 32 in a consumable 30.

In some embodiments, the computing device 40 forms part of the aerosol provision device 20, such that the aerosol provision device comprises the computing device 40. In this case, the computing device 40 may be part of the control circuitry 28, or may be separate from and communicatively coupled to the control circuitry 28, for example by a wired interface such as a Serial Peripheral Interface (SPI). The computing device 40 can then receive an image from the camera on the aerosol provision device 20 and perform the steps described above in order to approve the consumable 30 received by the aerosol provision device 20.

Figure 5:
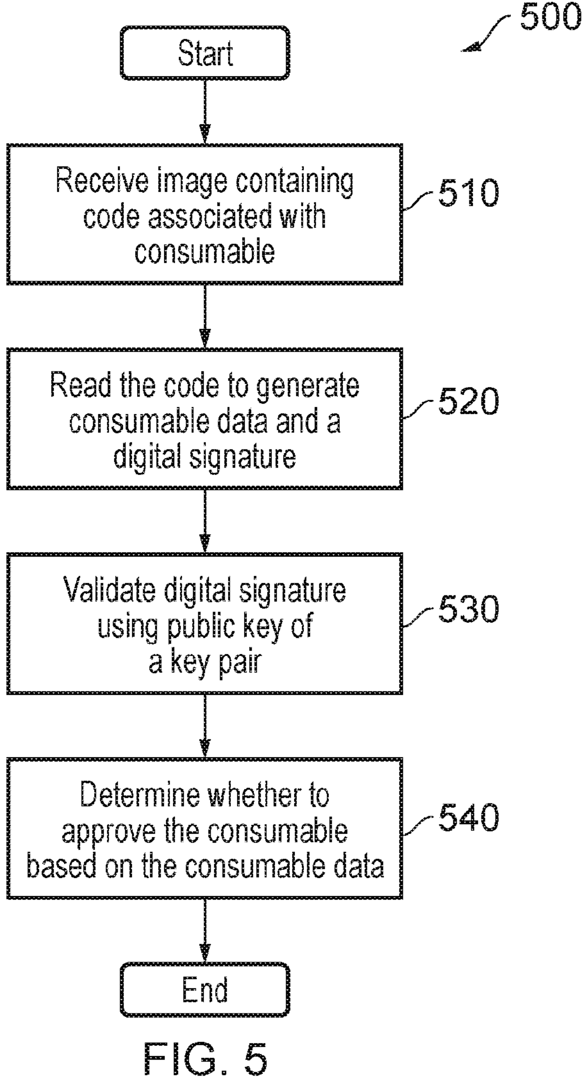
FIG. 5 is a flow chart of a method of approving a consumable of an aerosol provision system.

FIG. 5 is a flow chart of a method 500 of approving a consumable 30 of an aerosol provision system 10, for example performed by the computing device 40. The method begins at step 510, where an image containing a code 33, 53 associated with the consumable 30 is received. At step 520, the code 33, 53 is read to generate consumable data and a digital signature. At step 530, the digital signature is validated using a public key of a key pair. At step 540, a determination whether to approve the consumable 30 is performed based on the consumable data in response to the digital signature being validated.

Figure 6:
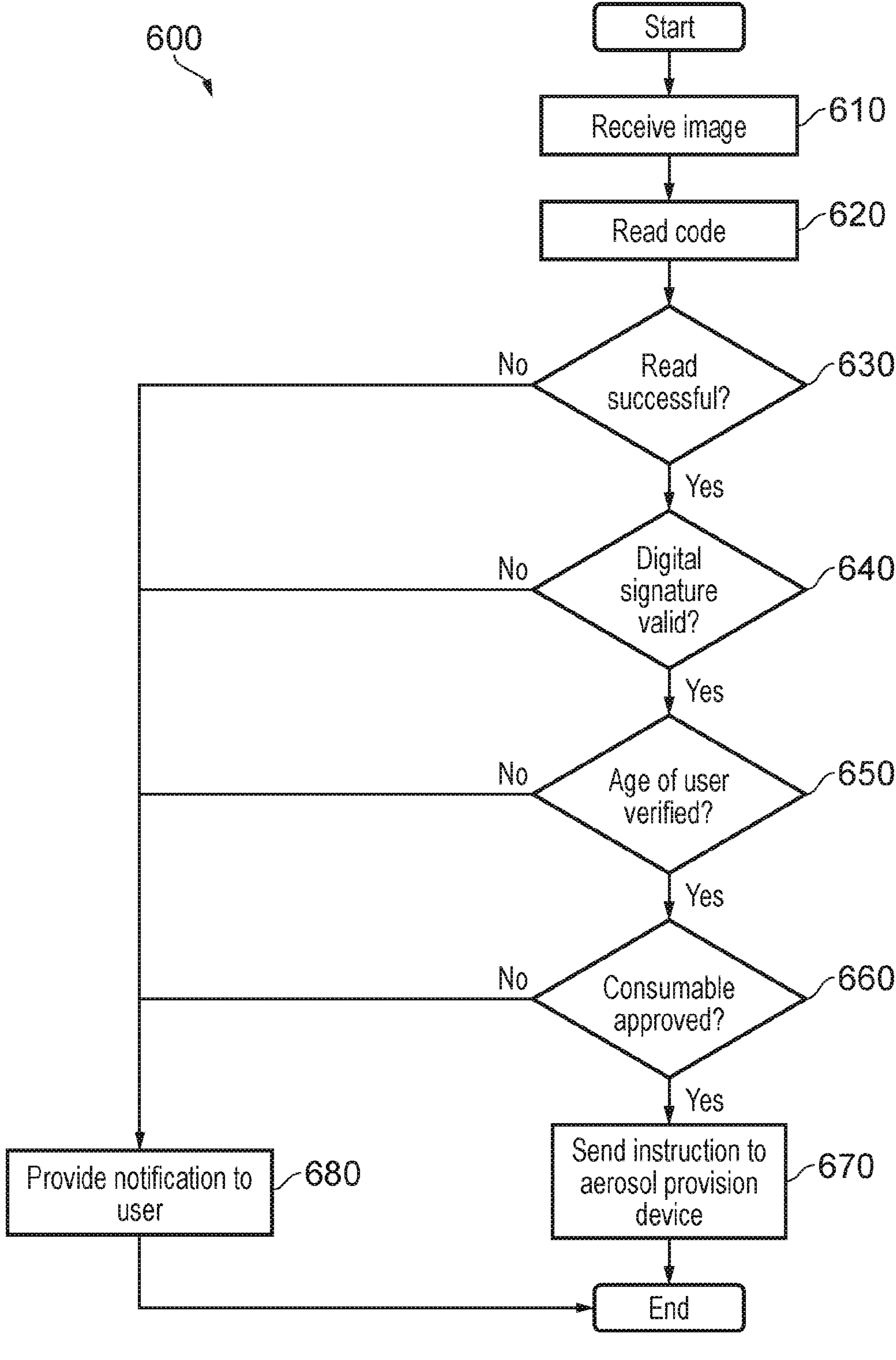
FIG. 6 is a flow chart of a further method of approving a consumable of an aerosol provision system.

FIG. 6 is a flow chart of a further method 600 of approving a consumable 30 of an aerosol provision system 10, for example performed by the computing device 40. The method begins at step 610, where an image containing a code 33, 53 associated with the consumable is received. At step 620, the code is read. At step 630 it is determined whether the code 33, 53 has been successfully read. If the code 33, 53 has not been successfully read, the method continues to step 680, where a notification is provided to the user of the aerosol provision system 10. The method then ends. If at step 630 the code 33, 53 has been successfully read, consumable data and a digital signature are generated and the method continues to step 640, where the digital signature is validated using the public key of the key pair and it is determined whether the digital signature is valid. If the digital signature is not valid (in other words, the consumable 30 is not authentic), the method continues to step 680, where a notification is provided to the user of the aerosol provision system 10. The method then ends. If at step 640 the digital signature is valid, the method continues to step 650, where the age of the user of the aerosol provision system 10 is verified based on information associated with the user. If the age of the user is not verified, the method continues to step 680, where a notification is provided to the user of the aerosol provision system 10. The method then ends. If at step 650 the age of the user is verified, the method continues to step 660, where a determination whether to approve the consumable 30 is performed based on the consumable data. If the determination determines not to approve the consumable 30 (i.e. the consumable 30 is not approved), the method continues to step 680, where a notification is provided to the user of the aerosol provision system 10. The method then ends. If the determination determines to approve the consumable 30 (i.e. the consumable 30 is approved), the method continues to step 670, where an instruction is sent to the aerosol provision system 10. As described above, the instruction may comprise the enabling of the aerosol generator 36 of the aerosol provision system 10, for example for a number of inhalations by the user of the aerosol provision system 10. The method then ends.

The methods 500 and 600 illustrated in FIGS. 5 and 6 may be stored as instructions on a computer readable storage medium, such that when the instructions are executed by a processor, the methods 500 and 600 described above are performed. The computer readable storage medium may be non-transitory. In other words, the methods 500 and 600 illustrated in FIGS. 5 and 6 may be computer implemented.

As described above, the present disclosure relates to (but it not limited to) a computing device configured to receive, an image containing a code associated with a consumable of an aerosol provision system. The computing device reads the code to generate consumable data and a digital signature. The computing device validates the digital signature using a public key of a key pair, and determines whether to approve the consumable based on the consumable data in response to the digital signature being validated.

Thus, there has been described a computing device and a method of approving a consumable of an aerosol provision system.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the disclosure, and that other embodiments may be utilized and modifications may be made without departing from the scope of the disclosure. Various embodiments of the disclosure may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A computing device configured to:

capture, using a camera on the computing device, an image containing a code associated with a consumable of an aerosol provision system, wherein the aerosol provision system comprises the consumable and an aerosol provision device;

read and decode the code to obtain consumable data and a digital signature;

validate the digital signature using a public key of a key pair comprising the public key and a private key, wherein the public key is stored on the computing device;

determine whether to approve the consumable based on the consumable data in response to the digital signature being validated; and send an instruction to the aerosol provision device in response to the determining to approve the consumable, wherein the instruction comprises an enabling of an aerosol generator of the aerosol provision system when the consumable is determined to be approved, and wherein the computing device is separate from the aerosol provision system.

2. The computing device of claim 1, wherein the consumable data comprises an identifier for the consumable.

3. The computing device of claim 2, wherein determining whether to approve the consumable comprises comparing the identifier to a list of identifiers.

4. The computing device of claim 2, wherein determining whether to approve the consumable comprises:

sending the identifier to a remote data store to compare the identifier to a list of identifiers stored at the remote data store; and receiving, from the remote data store, an indication as to whether the identifier is contained in the list of identifiers.

5. The computing device of claim 1, wherein the computing device is further configured to:

provide a notification to the user based on the determining whether to approve the consumable.

6. The computing device of claim 5, wherein the notification is provided to the user in response to determining not to approve the consumable.

7. The computing device of claim 1, wherein the computing device is further configured to:

verify an age of a user of the aerosol provision system based on information associated with the user.

8. The computing device of claim 7, wherein the computing device is further configured to:

provide a notification to the user based on the verifying the age of the user.

9. The computing device of claim 1, wherein the computing device is further configured to:

provide a notification to a user of the aerosol provision system based on the validating of the digital signature.

10. The computing device of claim 9, wherein the notification is provided to the user in response to the validating indicating that the consumable is not authentic.

11. The computing device of claim 1, wherein the code is located on the consumable.

12. The computing device of claim 1, wherein the computing device is further configured to:

provide a notification to a user of the computing device in response to the reading the code not being successful.

13. The computing device of claim 12, wherein the image is a first image and wherein the notification indicates to the user to capture a second image containing the code, wherein the second image is different to the first image.

14. The computing device of claim 12, wherein the image is a first image and wherein the notification indicates to the user to capture a second image containing a different code.

15. The computing device of claim 14, wherein the different code is located on packaging for the consumable.

16. The computing device of claim 1, wherein the instruction comprises one or more operational parameters for the aerosol provision system.

17. The computing device of claim 16, wherein the enabling of the aerosol generator is for a number of inhalations by a user of the aerosol provision system.

18. A system comprising:

the computing device of claim 1; and an aerosol provision device.

19. A method of approving a consumable of an aerosol provision system comprising the consumable and an aerosol provision device, the method comprising:

capturing, using a camera of a computing device, an image containing a code associated with the consumable;

reading and decoding, by the computing device, the code to obtain consumable data and a digital signature;

validating by the computing device, the digital signature using a public key of a key pair comprising the public key and a private key, wherein the public key is stored on the computing device;

determining by the computing device, whether to approve the consumable based on the consumable data in response to the digital signature being validated; and sending by the computing device, an instruction to the aerosol provision device in response to the determining to approve the consumable, wherein the instruction comprises an enabling of an aerosol generator of the aerosol provision system when the consumable is determined to be approved, and wherein the computing device is separate from the aerosol provision system.

20. A computer readable storage medium storing instructions which, when executed by a processor of a computing device, performs a method of approving a consumable of an aerosol provision system comprising the consumable and an aerosol provision device, the method comprising:

capturing, using a camera of the computing device an image containing a code associated with the consumable;

reading and decoding the code to obtain consumable data and a digital signature;

validating the digital signature using a public key of a key pair comprising the public key and a private key, wherein the public key is stored on the computing device;

determining whether to approve the consumable based on the consumable data in response to the digital signature being validated; and sending an instruction to the aerosol provision device in response to the determining to approve the consumable, wherein the instruction comprises an enabling of an aerosol generator of the aerosol provision system when the consumable is determined to be approved, and wherein the computing device is separate from the aerosol provision system.

* * * * *